UNITED STATES PATENT OFFICE.

WALTER O. SNELLING, OF PITTSBURGH, PENNSYLVANIA.

SEALING-WAX.

1,239,629.  Specification of Letters Patent.  Patented Sept. 11, 1917.

No Drawing.  Application filed October 14, 1915.  Serial No. 55,755.

*To all whom it may concern:*

Be it known that I, WALTER O. SNELLING, a citizen of the United States, and a resident of Pittsburgh, in the county of Allegheny and State of Pennsylvania, have invented a new and useful Improvement in Sealing-Wax, of which the following is a specification.

My invention relates to plastics of the sealing wax variety, and has for its object to provide sealing waxes and other plastics which shall be difficultly inflammable, or wholly non-inflammable.

Sealing wax usually consists of a fusible adhesive binder, a finely pulverized inert filler, and suitable coloring matter. In certain grades, the filler is ordinary rosin, while in other varieties, the binder may be shellac or any one of a large number of gums and waxes.

The binding materials which are suitable for use in sealing wax are more or less inflammable, and for certain uses, notably in electrical fixtures and appliances, this inflammability is a serious source of danger. For example, electric terminal bushings, plugs, sockets and household lighting fixtures are very commonly sealed with rosin sealing wax, containing about 50% of rosin, and a device of this kind may easily be the source of a dangerous fire, since the sealing wax readily ignites when unduly heated. Such overheating may occur either through arcing and other irregular current conditions, or through exposure to external heat.

According to my present invention, I prepare sealing wax compositions containing fire-extinguishing ingredients, which effectually prevent the waxes from taking fire, and which in no way impair their plasticity or adhesiveness. The suitable fire-extinguishing ingredients comprise a considerable number of substances, but I prefer to employ certain polyhalogenated carbon compounds, such as the chlorin polysubstitution products of ethane, propane, naphthalene and other hydrocarbons. Of these polyhalogenated bodies, I find that the following are effective agents for my present purpose: ethane pentabromid, $C_2HBr_5$; ethane hexachlorid, $C_2Cl_6$; propane pentachlorid, $C_3H_3Cl_5$; propane hexachlorid, $C_3H_2Cl_6$; propane heptachlorid, $C_3HCl_7$; propane octachlorid, $C_3Cl_8$; naphthalene tetrachlorid, $C_{10}H_4Cl_4$; hexachlor-benzol, $C_6Cl_6$; hexabrom-butane, $C_4H_4Br_6$; hexabrom-ethane, $C_2Br_6$; and mixed substitution compounds containing more than one of the halogens, such as tetrachloridbrom-ethane, $C_2Cl_4Br_2$. All of these substances have high vapor pressures at or below the igniting point of the usual sealing wax binders, and yield vapors which neither burn nor support combustion. I do not desire to be restricted to the use of these specific substances, or of this class of substances, since any material, or mixture of materials, having the requisite properties, may be employed within the scope of my invention.

Any of the usual sealing wax compositions may be modified according to my invention, by adding one or more of the foregoing fire-extinguishing substances, or their equivalents. For example, one good composition for electrical insulation is made by mixing about 45 parts of pulverized calcium carbonate, 45 parts of rosin, 10 parts of ethane hexachlorid and ½ part of dry vermilion or other suitable pigment.

Another effective composition, of finer texture, is made by mixing about 30 parts of precipitated chalk, 64½ parts of shellac, 5 parts of chlorinated naphthalene and ½ part of dry vermilion or other pigment. In both of these compositions, the fusible, inflammable resin is mutually soluble with the fire-extinguishing substance that is employed, and the resulting products are homogeneous, brittle masses, containing in suspension any fillers that may be used.

My invention is by no means limited to the substances and proportions mentioned above, which are intended to be merely illustrative. I desire to claim broadly the addition of fire-preventing or extinguishing substances to sealing waxes and other plastics and no limitations are to be imposed upon my invention except such as are indicated in the appended claims.

I claim as my invention:

1. Sealing wax containing rosin and a solid or semi-solid, vaporizable fire-extinguishing substance.

2. Sealing wax containing rosin and a solid or semi-solid halogenated carbon compound.

3. Sealing wax comprising rosin, a filling material, a coloring material and a vaporizable solid or semi-solid fire-extinguishing substance.

4. Sealing wax comprising rosin, a filling material, a coloring material and a solid or semi-solid halogenated carbon compound.

5. Sealing wax comprising an inflammable resinous substance, a filler, and ethane hexachlorid.

6. Sealing wax comprising rosin, a filler, and ethane hexachlorid.

7. Sealing wax comprising substantially equal parts of an inflammable resinous substance and a filler, and a substantially less proportion of a solid or semi-solid vaporizable fire-extinguishing substance.

8. Sealing wax comprising about 45 parts of an inert filler, about 45 parts of an inflammable resinous substance and about 10 parts of a vaporizable fire-extinguishing substance.

9. Sealing wax comprising about 45 parts of an inert filler, about 45 parts of rosin and about 10 parts of ethane hexachlorid.

In testimony whereof, I have hereunto subscribed my name this 6th day of October 1915.

WALTER O. SNELLING.

Witnesses:
M. R. McKeown,
J. G. Kaiser.